United States Patent [19]

Scherer

[11] 4,006,925
[45] Feb. 8, 1977

[54] WIND POWER ENERGY GENERATING SYSTEM

[76] Inventor: Peter Scherer, 554 Hargrave Ave., Inglewood, Calif. 90302

[22] Filed: Aug. 15, 1974

[21] Appl. No.: 497,696

[52] U.S. Cl. .................................. 290/55; 290/44; 200/80 R
[51] Int. Cl.² ........................................ F03D 9/00
[58] Field of Search ............. 290/55, 44; 200/80 R; 416/51

[56] References Cited

UNITED STATES PATENTS

| | | | |
|---|---|---|---|
| 1,589,828 | 6/1926 | Williams et al. | 290/55 |
| 1,632,565 | 6/1927 | Schmidt | 200/80 R |
| 1,734,245 | 11/1929 | Distefano | 290/55 |
| 2,248,218 | 7/1941 | Daniels | 290/55 |
| 2,655,604 | 10/1953 | Hutter | 290/55 |
| 2,964,111 | 12/1960 | Morris | 290/55 |
| 3,553,400 | 1/1971 | Greenhut | 200/80 R |
| 3,603,751 | 9/1971 | Smith | 200/80 R |

Primary Examiner—Robert S. Macon
Attorney, Agent, or Firm—Robert J. Schaap

[57] ABSTRACT

A wind-driven power generating apparatus which includes a main support for securement to a fixed structure. A main drive shaft is retained by this main support and is connected at one of its outer ends to a support block having a plurality of angularly spaced, radially extending, support shafts, each one of which carry a windmill-type blade. The other end of the main drive shaft extends into a housing having a support frame for retaining a gear drive mechanism. One of the gears in this gear drive mechanism is connected to the main drive shaft. Also included within the gear drive mechanism located within the housing is a second gear which drives a pair of alternators for generating electrical power as the support block is rotated by the wind vanes. A first speed control mechanism is associated with each of the vanes and rotates the vanes axially about their longitudinal center line in proportion to the speed of the wind in order to protect the apparatus against excess rotation due to excess wind speed. A second speed control mechanism is associated with the apparatus and prevents energization of the field windings forming part of the alternators which generate the current, if rotation of vanes does not achieve a minimum speed.

24 Claims, 6 Drawing Figures

WIND POWER ENERGY GENERATING SYSTEM

BACKGROUND OF THE INVENTION

This invention relates in general to certain new and useful improvements in wind power driven electric generating apparatus, and, more particularly, to wind power driven electric generating apparatus which includes maximum and minimum speed control devices.

In recent years, there have been many developments in windmill power generating apparatus of the type which are capable of generating electrical energy through wind power, more particularly referred to as "solar wind" power. The research and development activity in apparatus of this type has increased in recent times due to energy constraints, or at least potential energy contraints. However, these research and development activities have been directed primarily to increasing the efficiency of operation of apparatus of this type, that is, increasing power output based on the amount of energy available from any given amount of wind power.

While research and development activities directed to increasing the efficiency of wind power electrical energy generating apparatus may be effective, little effort has been directed to controlling the operation of such apparatus in such manner that adverse results are not created. For example, it is well established that if the wind velocity increases beyond a pre-established amount, excessive rotation could substantially injure the internal components in these forms of wind power driven electric generating apparatus. Moreover, electrical energy is generated in apparatus of this type through the means of alternators or generators. It has also been established that if the speed of rotation of wind vanes is not sufficient to create sufficient electrical energy to energize the field windings of the alternators, for example, damage to the alternators will also result. Consequently, apparatus of this type should operate under pre-established maximum generating capabilities and pre-established minimum generating capabilities. Nevertheless, little effort has been directed to control of this form of apparatus to operate within these pre-established limits.

The present invention obviates these and other problems in the provision of a wind power electric energy generating apparatus which is capable of efficient operation by controlling energy generating mechanisms, such as alternators, through vanes which are rotated by wind power. The operation of these alternators is capable of generating electrical energy used to energize storage cells, such as conventional D.C. batteries. Moreover, the apparatus of the present invention includes a mechanism for reducing the speed of rotation of the wind vanes in the event that the wind velocity becomes excessive, to thereby prevent damage to the apparatus. In like manner, the apparatus also includes a mechanism which prevents energization of the windings of the energy generating mechanisms in the event that wind velocity is not sufficient to achieve the generation of the minimum amount of electrical energy.

It is, therefore, the primary object of the present invention to provide an apparatus which is capable of generating electrical energy through wind driven power and which includes wind velocity control mechanisms.

It is another object of the present invention to provide an apparatus of the type stated which is capable of generating electrical energy when wind velocity achieves at least a certain minimum threshold level and controlling operation of the apparatus when wind velocity exceeds a maximum threshold level.

It is a further object of the present invention to provide an apparatus of the type stated which operates with a high degree of efficiency and requires little, if any, maintenance.

It is an additional object of the present invention to provide a method of generating electric energy through wind power which requires little, if any, manual attention.

It is another salient object of the present invention to provide an apparatus of the type stated which is highly effective in operation, rigid and durable in construction, and requires little, if any, maintenance.

With the above, and other objects in view, my invention resides in the novel features of form, construction, arrangement, and combination in parts presently described and pointed out in the claims.

GENERAL DESCRIPTION

The present invention may be described in general terms as a wind driven electric energy generating apparatus which in its broad aspect includes a support means and a main shaft carried by this support means. A plurality of vanes are connected to a vane drive mechanism and which is also carried by the main shaft and rotate this main shaft in response to wind driven power. The apparatus similarly includes electric energy generating means to generate power in response to rotation of the main shaft. This electric energy generating means may adopt the form of one or more alternators or similar electric energy generating devices. The electrical energy thus generated may be used to power storage cells or actually drive electrical equipment.

One of the unique aspects of the present invention is that this apparatus includes a first maximum threshold speed of rotation control associated with the vane drive mechanism. In this case, each of the vanes are mounted on vane support shafts which also carry shiftable weights thereon. As the weights shift outwardly due to centrifugal force resulting from excess speed of rotation of the vanes, these weights will shift biasing arms which, in turn, rotate the adjacent vane support shafts about their central axis and, hence, rotate the vanes about their respective longitudinal axes. In this way, the flat surfaces of the vanes may all be angulated slightly with respect to wind direction. As this occurs, the speed of rotation of the various vanes will be inherently reduced.

The apparatus of the present invention also includes a second minimum speed control device which exists in the form of a minimum threshold speed control. This latter device is designed to prevent energization of the field windings of the electric energy generating devices in the event that the speed of rotation is not sufficient. In this case, centrifugal force actuated weights also shift in response to the speed of rotation. If the weights do not shift sufficiently in order to close micro-switches, the field windings of the energy generating devices cannot be energized and in this way prevent injury to the energy generating devices.

Moreover, the apparatus of the present invention also includes a flag mechanism which automatically shifts the apparatus rotatably about its main support in order to insure optimum surface area of the vanes displayed toward the impinging wind. In addition, a motor may be energized and controlled from a remote source and can also shift the entire apparatus about its main support for purposes of shutting down the apparatus.

BRIEF DESCRIPTION OF THE DRAWINGS

Having thus described the invention in general terms, reference will now be made to the accompanying drawings in which:

DETAILED DESCRIPTION

Referring now in more detail and by reference characters to the drawings which illustrate a practical embodiment of the present invention, A designates a wind power electrical energy generating apparatus of the type which is capable of producing electrical energy pursuant to power of the solar wind. Apparatus of this type have also been described as "wind driven power plants," or otherwise as "wind powered generating systems".

It has been well recognized that wind power can be used to provide electric energy for home or industrial or commercial use in many areas. In this respect, it is considered practical in areas where wind speeds average approximately eight miles per hour or more to use apparatus of this type. In order for a wind power to generate a constant source of electricity, it is typically necessary to use a storage cell in the form of electric storage batteries. In many cases, in order to provide alternating current power from this system, a direct current to alternating current electrical convertor may also be required. One important criterion with respect to apparatus of this type is that the energy which is removed from the storage cells must at least equal the energy which is reintroduced into the storage cells by virtue of operation of the windmill. This latter requirement is actually more important than the short-term peak power demand as peak power demands can be easily handled by the storage cells.

Figure 1:
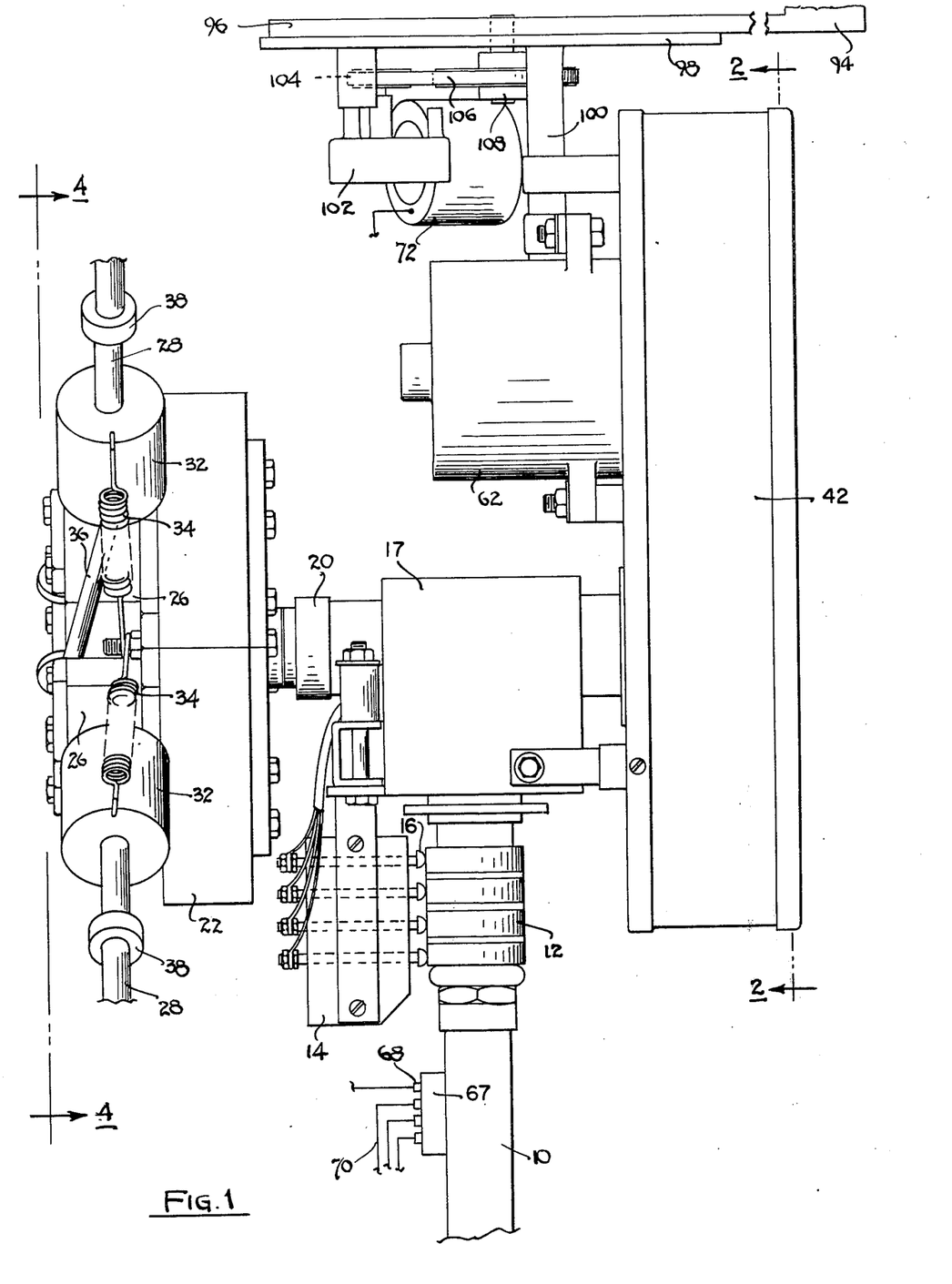
FIG. 1 is a side elevational view of the apparatus of the present invention, partly broken away and partially shown in phantom lines.

The apparatus of the present invention includes a main support shaft 10 which is provided at its lower end with a base (not shown) for mounting to a rigid support structure. The upper end of the support shaft 10 is provided with a plurality of contact rings 12 and while four such contact rings 12 are shown, any number thereof could be used in accordance with the present invention. These contact rings 12 operate in conjunction with a dielectric slate 14 which contains four electric brushes 16, in the manner as illustrated in FIG. 1 of the drawings. Again, the number of brushes 16 would be equivalent to the number of contact rings 12, for reasons which will presently more fully appear.

Figure 4:
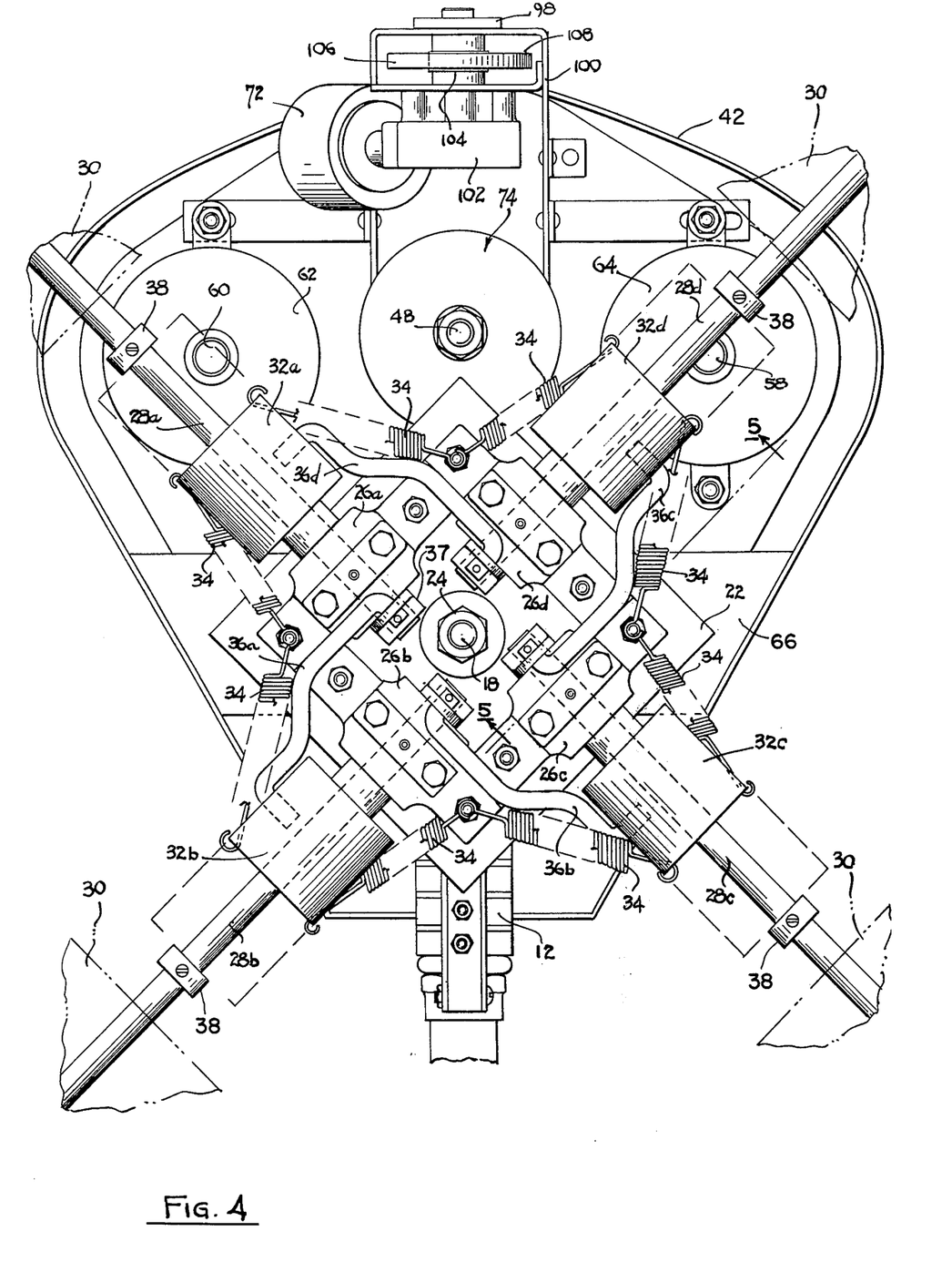
FIG. 4 is an end elevational view of a portion of the apparatus of FIG. 1, partially broken away and substantially taken along the plane of line 4—4 of FIG. 1.

Secured to the upper end of the shaft 10 is a main mounting sleeve 17 which retains a main drive shaft 18 and which permits rotation thereof through the means of bearings 20. The left-hand end of the main drive shaft 18 is secured to a rotatable support block 22 by means of a fixedly secured threaded nut 24, in the manner as illustrated in FIGS. 1 and 4 of the drawings. Consequently, this block 22 will rotate with the main drive shaft 18.

Secured to the rearward end of the support block 22 are four quadrilaterally located bearings 26 and include those bearings designated respectively as 26a, 26b, 26c and 26d. Actually, only the bearing housings, or so-called "races", of these bearings have been shown, but are nevertheless conventionally referred to as "bearings". These bearings 26 generally include a bearing housing having ball bearings, and which may function as radial and thrust bearings. Each of these bearings 26 support outwardly extending vane support shafts or rods 28 and which are respectively designated at 28a, 28b, 28c and 28d.

Mounted on the outer end of each of these rods 28, by any conventional means, are wind vanes 30. These wind vanes 30, which are often referred to as "propellor blades" or "rotor blades" are generally rectangular in shape, although any desired shape may be employed. These blades 30 are designed to provide optimum electrical energy through wind power and, in this respect, may be designed with the desired shape and, more particularly, the desired length to conform to the overall design requirements to the apparatus A.

It can be observed that for a given length and design of the rotor blades 30, the speed of rotation of the blades 30, and hence the support block 22, is a function of the wind velocity. It has been recognized that if the wind velocity increases beyond a certain amount or "maximum threshold limit", the rotational speed of the blades 30, and hence the support block 22, increases to a point which may exceed the design requirements of the apparatus A and which could potentially damage the apparatus A. Therefore, the present invention provides a maximum speed control system which automatically compensates for increased wind velocity and hence rotation beyond the maximum threshold limit.

This maximum speed control system is more fully illustrated in FIGS. 1 and 4 of the drawings, and is often referred to as a "governor control" or "feathering system". The maximum threshold speed control system comprises an individual cylindrically shaped hub axially disposed on each of the vane support rods 32. Thus, four such hubs 32a, 32b, 32c and 32d are provided. Each of the hubs 32 are axially shiftable along the vane support rod 28, and therefore are independently shiftable with respect to the vane support rods 28 in the axial direction, and, in addition, the support rods 28 can rotate about their central axes independently of the hubs 32. Thus, for example, the hub 32a may be shifted axially outwardly along the support rod 28a to the position as illustrated in the phantom lines of FIG. 4, but, in addition, the support rod 28a can rotate within the hub 32a about its axial centerline. Moreover, it can be observed that each of the hubs 32 are biased inwardly toward the support block 22 by means of a plurality of springs 34.

When the speed of rotation of the vanes 30 becomes excessive, that is, it increases beyond the maximum rotational threshold limit, the vane support rods 28 will each rotate about their longitudinal central axis within the associated bearing blocks 26 sufficiently so that the pitch angle of the vanes are changed with respect to the wind. In this way, it can be observed that if the flat surfaces of the vanes were disposed directly toward the path of the wind, maximum rotation of the vanes 30 and support block 22 would be achieved. In like manner, if one of the longitudinal edge margins of each of the vanes were disposed within the wind path, little or no rotation of the entire system, including the support block 22 and the shaft 18, would be achieved. Consequently, the amount of rotation of the vanes 30 along their central axis within the bearing blocks 26 is dependent upon the velocity of the wind in such manner that the axial rotation of the vane support rods 28 is sufficient to maintain the speed of rotation of the support block 22 and main shaft 18 within the maximum threshold rotational limit.

Figure 5:
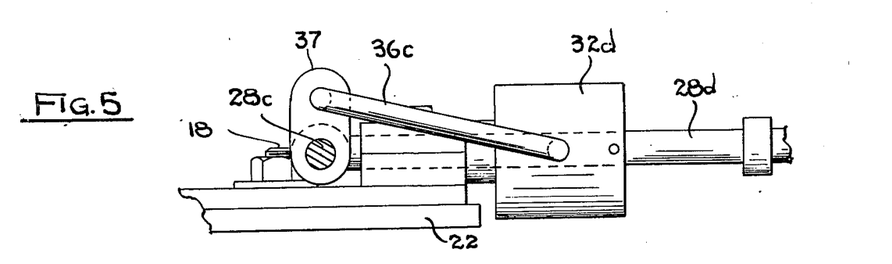
FIG. 5 is a fragmentary sectional view taken along line 5—5 of FIG. 4.

In order to enable the rotation of the vane support rods 28 about their central axis, a plurality of biasing rods 36 are provided and include the biasing rods 36a, 36b, 36c and 36d. It can be observed that the biasing rod 36a is pivotably secured to the vane support rod 28a at one end through a link 37 and is pivotably secured at its other end to the hub 32b. In like manner, the biasing rod 36b is pivotably secured to the vane support rod 28b at one end, through a link 37, and at its other end to the hub 32c. The biasing rods 36c and 36d are all connected in like manner, as illustrated in FIGS. 4 and 5 of the drawings.

The hubs 32 are shifted outwardly axially along the associated vane support rods 28 by means of centrifugal force. In this respect, the springs 34 are selected with a proper spring tension in order to enable the axial shifting movement of the hubs 32 at any given rotational speed of the vanes 30 and hence the main shaft 18. It can be observed that when the speed of rotation of the vanes 30 begins to increase and tends to traverse the maximum threshold velocity, the hubs 32 will shift outwardly and axially along the vane support rods 28. Moreover, it can be observed that if each of the springs 34 are designed with the same amount of tension, or substantially the same amount of tension, and if the hubs 32 are all of about the same approximate weight and mass, then all hubs 32 would shift outwardly to approximately the same degree on the vane support rods 28. As these hubs do shift outwardly, it can be observed that they will cause the vane support rod 28 of the next associated vane to rotate about its central axis. Thus, for example, it can be observed that if the hub 32c shifted outwardly along the vane support rod 28c, the biasing rod 36b which is also pivotally secured to the vane support rod 28b would cause this latter vane support rod 28b to rotate about its axial longitudinal. In like manner, as the hub 32b is shifted outwardly, the biasing rod 36a will cause the vane support rod 28a to rotate about its central axis. The same action will result with respect to the vane support rods 28c and 28d.

It can be observed that as the vane support rods 28 are rotated about their central axes, the vanes 30 will be shifted to a pitch angle such that less surface areas of the vanes 30 are presented to the wind and hence the speed of rotation of the various vanes, and hence the speed of rotation of the shaft 18, will be reduced. Moreover, it can also be observed that this system is self-monitoring so that the speed of rotation of the vanes 30 and the shaft 18 is always maintained below the maximum threshold limit.

Each of the vane support rods 28 are also provided intermediate the hubs 32 and vanes 30 with a disc 38 which is designed to control the outer limit of movement of the various hubs 32.

Figure 2:
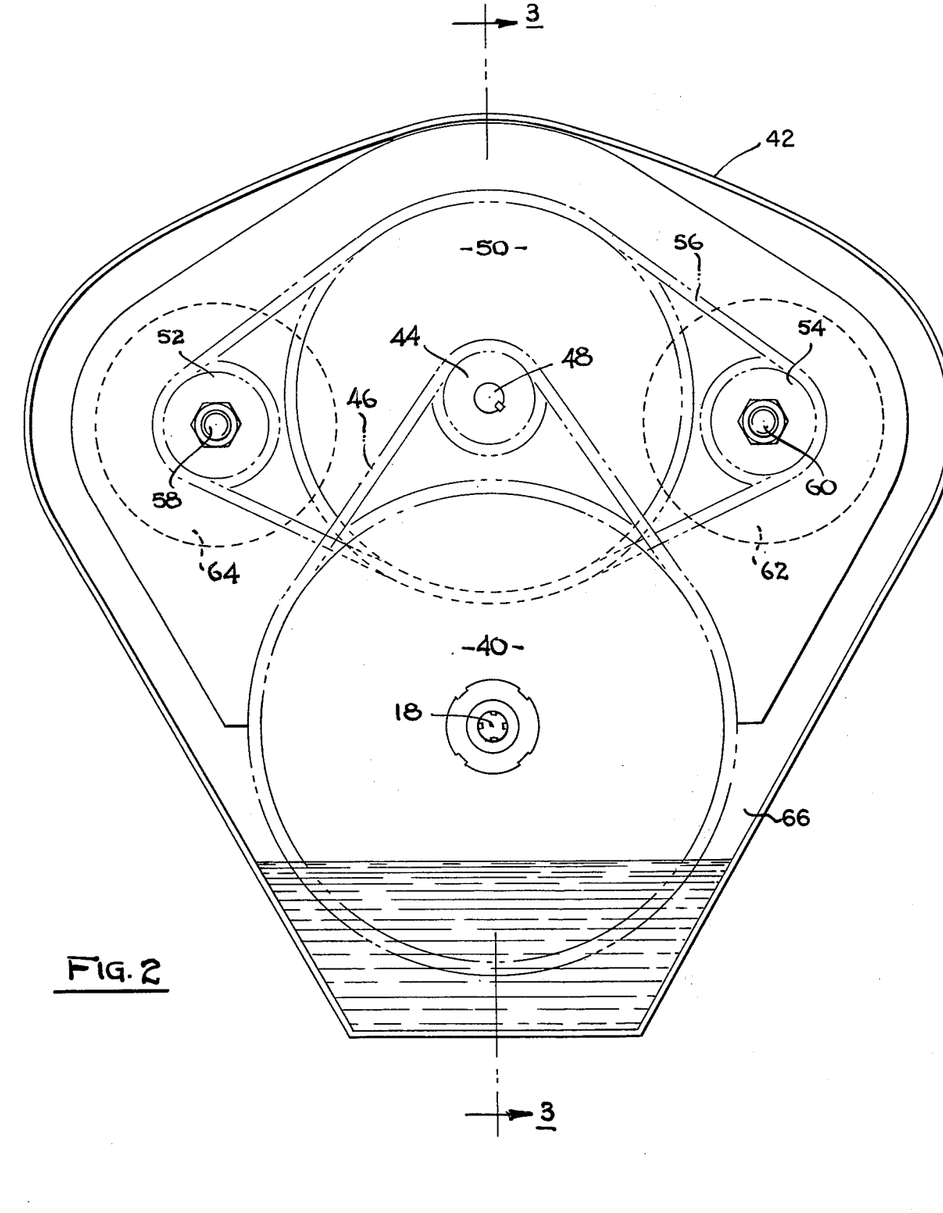
FIG. 2 is a vertical sectional view taken along line 2—2 of FIG. 1.
Figures 3, 6:
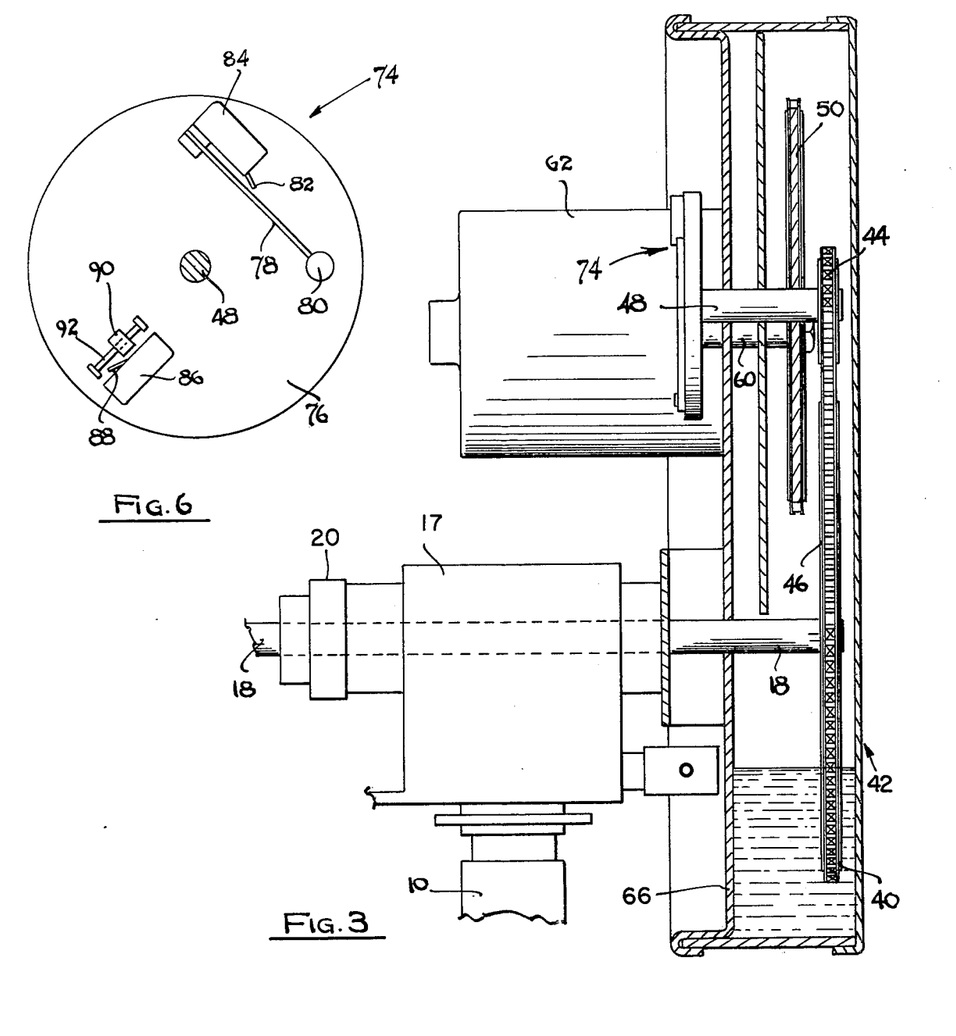
FIG. 3 is a fragmentary vertical sectional view, taken along line 3—3 of FIG. 2.
FIG. 6 is a side elevational view of a portion of one of the threshold control units forming part of the apparatus of the present invention.

Rigidly secured to the forward end of the main shaft 18, reference being made to FIGS. 1–3, is a main drive gear 40. By reference to FIG. 3, it can be observed that the main shaft 18 extends through a rectangularly shaped metal frame 42 which is in turn secured to the main mounting sleeve 17. The main drive gear 40 also drives a pinion gear 44 by means of a drive chain 46, in the manner as illustrated in FIG. 2 of the drawings. The pinion gear 44 is, in turn, mounted on a stub shaft 48 which is journaled within the frame 42, in the manner as illustrated in FIG. 3 of the drawings. Also keyed or otherwise secured to the stub shaft 48 and being rotable therewith is a diametrally enlarged pinion gear 50, which, in turn, rotates a pair of pinion gears 52 and 54 through a drive chain 56. The pinion gears 52 and 54 are similarly mounted on alternator drive shafts 58 and 60 which respectively drive the rotors of a pair of current generating devices, such as alternators 62 and 64 respectively, in a manner to be hereinafter described in more detail.

By further reference to FIGS. 2 and 3, it can be observed that the frame 42 extends within and, in turn, supports a gear containing and lubricating housing 66 which is provided with a lower trough portion containing a suitable lubricating fluid, such as oil. In addition, it can be observed that the main drive gear 40 extends into this bath of lubricating fluid.

Thus, as the main drive gear 40 rotates, it will also rotate the drive chain 46. The drive chain 46 which is basically a conventional sprocket is constructed in such manner that it will actually pickup or retain some of the oil in the aperatured portions thereof which will, in turn, lubricate the pinion gear 44. Moreover, when the speed of rotation of the shaft 18 and hence the drive gear 40, as well as the drive chain 46, is sufficient, the sprocket 46 will effectively entrain the oil and disperse the same as a result of rotation thereof, so that the oil is, in effect, sprayed to the various rotating components located within the housing 66. In this way, it is possible to construct the device without the requirement for impregnated oil bearings or otherwise, eliminate the requirement of periodic oiling of bearings and other movable components.

The alternators 62 and 64 are essentially conventional items and are secured to the frame 40. Moreover, these alternators 62 and 64 are sized so that they are capable of generating A.C. electrical power through the rotation of their rotors. In actuality, the stater or so-called "field winding" of the alternator axially rotates with respect to a stationary rotor, although alternators are frequently described as having the rotor as the rotating member. Notwithstanding, it should be understood that conventional generators could also be used in place of the alternators 62 and 64.

The outputs of the alternators 62 and 64 are connected to the dielectric plate 14 which, in turn, maintains contact with the contact rings 12 by means of the brushes 16. Connected to the contact rings 12 and being mounted on the main support shaft 10 is a junction box 67 which is provided with four individual contacts 68 and each of which are, in turn, provided with connecting wires 70, in the manner as illustrated in FIG. 1 of the drawings. The first of these wires 70 is ultimately connected to a flag control motor 72 to be hereinafter described in more detail. The second of the wires 70 is provided for a field discharge with respect to the alternators 62 and 64. The third and fourth of the wires 70 are provided for outputs from the alternators 62 and 64. In this respect, it should be observed that the outputs of the alternators 62 and 64 could be connected directly to a battery bank or other form of storage cell which stores D.C. power. Generally, the apparatus of the present invention would probably be used for purposes of storing power for ultimate later use thereof. However, it should also be observed that the output wires 70 which result from the outputs of the alternators 62 and 64 could be connected through a rectifying system for use as A.C. power in order to drive some sort of alternating current operating mechanism.

It is also recognized that if alternators or similar current generating devices are operated at too slow a speed, damage could result to the field windings of such device. Consequently, it is undersirable to energize the field windings unless a minimum speed of rotation of the rotary element is achieved. Consequently, the present invention provides a minimum threshold speed of rotation device 74 which is mounted on the frame 42 and which is more fully illustrated in FIGS. 4 and 6 of the drawings. The device 74 prevents energization of either of the alternators 62 and 64 until a minimum threshold speed of rotation of the vanes 30 and the main drive shaft 18 is achieved.

This minimum threshold speed control device 74 comprises a disc 76 which is also provided with a pivotal arm 78 mounted thereon. The arm 78 carries a weight 80 at its outer end. Thus, when the speed of rotation of the vanes 30, and hence the main drive shaft 18, achieves at least the minimum threshold rotational speed, centrifugal force will urge the weight 80 and arm 78 outwardly about the pivoted end of the arm 78 so that the arm 78 can engage the leaf 82 of a micro-switch 84. As the micro-switch 84 is closed, this permits energization of the field windings of the alternators 62 and 64. In this way, it can be observed that if the minimum rotational speed of the vanes 30 and hence the drive shaft 18 is not achieved, the micro-switch 84 will remain open, thereby preventing energization of the field windings of the alternators 62 and 64.

The speed control device 74 is also provided with an auxiliary limit switch control including a micro-switch 86 having a leaf contact 88 which is operable by a weight 90 movable on a pin 92. The weight 90 is normally biased radially inwardly with respect to the disc 76 and upon rotation of the disc 76 the centrifugal force will urge the weight 90 outwardly on the pin 92. As the minimum speed of rotation is achieved, the weight 90 will urge the leaf contact 88 to a closed position, thereby permitting the micro-switch 86 to energize the alternators 62 and 64. In this way, it can be observed that both the micro-switches 84 and 86 must be closed in order to permit the field windings of the alternators 62 and 64 to be energized.

The disc 76 is mounted on the shaft 48 so that the disc 76 rotates with the pinion gear 44 and hence, through the drive mechanism illustrated in FIG. 2, with the main shaft 18.

By reference to FIG. 1, it can be observed that the main support sleeve 17 and hence all of the components carried thereby is rotatably mounted on the main suppport shaft 10. In this way, the apparatus A can be rotated so that the vanes 30 are always located in an optimum position to receive the wind. Rotation of the apparatus A about the main support shaft 10 is accomplished by means of a flag 94 having an elongated arm 96 which is secured to a mounting plate 98, in the manner as illustrated in FIG. 1 of the drawings. It can be observed that the mounting plate 98 is secured to a bracket 100 which is, in turn, secured to the frame 42. In this way, the flag 94 which actually serves as a type of vane, will always align itself with the direction of the wind, and in so doing, will cause the apparatus A to shift about the main support shaft 10 until the flag 94 is in such alignment. Inasmuch as the vanes 30 have their flat surfaces perpendicularly located in space with respect to the flag 94, this orientation will always create the greatest flat surface area of the vanes 30 perpendicular to the wind direction.

The flag control motor 72 is connected through a gear drive 102 and operates a pulley 104. Moreover, the pulley 104 operates a pulley 108 through a drive belt 106 and the pulley 104 is secured to the underside of the mounting plate 98. In this way, the motor 72 can be energized to rotate the pulleys 104 and 108 in order to optionally rotate the plate 98 and hence the flag 94 to a desired position. Normally, the motor 72 would be used only for shifting the flag 94 and hence the apparatus A about the support shaft 10 to a position where a "shut-down" is desired. Thus, for example, when it is desired to completely de-energize the entire apparatus A, the motor 72 is energized so that the flag 90 and the entire apparatus is rotated to a position where the wind will not impinge upon the flat surfaces of the vanes 30.

Thus, there has been illustrated and described a wind powered electric energy generating system which includes the necessary minimum and maximum operating speed threshold control mechanisms, and which therefore fulfills all of the objects and advantages sought therefor. Many changes, modifications, and other uses and applications of the subject system will become apparent to those skilled in the art after considering this specification and the accompanying drawings. Therefore, all such changes, modifications other uses and applications are deemed to be covered by the invention which is limited only by the following claims.

Having thus described my invention, what I desire to claim and secure by letters patent is:

1. A wind driven electric energy generating apparatus comprising:
   a. support means,
   b. a main shaft carried by said support means,
   c. a plurality of vane shafts angularly located with respect to said main shaft,
   d. means operatively connecting said vane shafts to said main shaft so that said main shaft rotates with rotation of said vane shafts,
   e. a plurality of vanes secured to and extending outwardly from respective ones of said vane shafts to cause rotation of said main shaft when the vanes are driven by a wind,
   f. electric energy generating means operatively connected to said main shaft and being operable thereby to generate electric energy pursuant to rotation of said shaft, said electric energy generating means comprising a field winding and a flux operable shaft cooperating therewith,
   g. first speed control means operatively mechanically associated with said vane shafts and coupling each of said vane shafts to one another to prevent rotation of said vanes and said vane shafts and main shaft beyond a maximum threshold velocity of rotation, and h. second speed control means operatively associated with said main shaft and having a rotatable member operatively rotatable thereby, said second speed control means operatively connected to said field winding of said electric energy generating means to prevent energy generation of said field winding and thereby prevent operation of said generating means if said main shaft and said vanes do not meet a minimum threshold velocity of rotation.

2. The wind driven electric energy generating apparatus of claim 1 further characterized in that said electric energy generating means comprises a plurality of electric energy generating devices, each of which are operatively connected to said second speed control means, and auxiliary shaft means operatively connecting the flux operable shafts of said devices to said main shaft.

3. The wind driven electric energy generating apparatus of claim 1 further characterized in that gear operated means operatively connects said main shaft to said energy generating means.

4. The wind driven electric energy generating apparatus of claim 1 further characterized in that gear operated means operatively connects said main shaft to said energy generating means, and that said gear operated means comprises a first gear operatively mounted on said main shaft, an auxiliary shaft means operating said electric energy generating means, a second gear operatively mounted on said auxiliary shaft means, and connecting drive means interconnecting said first gear and second gear.

5. The wind driven electric energy generating apparatus of claim 1 further characterized in that gear operated means operatively connects said main shaft to said energy generating means, and that said gear operated means comprises a first gear operatively mounted on said main shaft, an auxiliary shaft means operating said electric energy generating means, a second gear operatively mounted on said auxiliary shaft means, connecting drive means interconnecting said first gear and second gear, means providing a lubricating fluid bath located to receive said first gear in such manner that said first gear and connecting drive means temporarily picks up and disperses the lubricating fluid to said second gear.

6. The wind driven electric energy generating apparatus of claim 1 further characterized in that direction control means is operatively associated with said apparatus to automatically rotate said apparatus to a position where the surface area of said vanes receive maximum exposure to the wind depending on wind direction.

7. The wind driven electric energy generating apparatus of claim 1 further characterized in that direction control means is operatively associated with said apparatus to automatically rotate said apparatus to a position where the surface area of said vanes receive maximum exposure to the wind depending on wind direction, overriding control means operatively connected to said direction control means to permit rotation of said apparatus under control of an operator to a desired position with respect to wind direction.

8. The wind driven electric energy generating apparatus of claim 1 further characterized in that said first and second speed control means are operated by centrifugal force.

9. An apparatus for controlling the maximum speed of rotation of a main shaft rotatably driven by a plurality of members rotatable in response to an external force, said apparatus comprising a plurality of connecting rods, each one of said connecting rods respectively associated with and operatively connecting each one of said plurality of members to said shaft, a shiftable element operatively mounted on and being slidable on each of said rods and being biased in a first direction in response to centrifugal force created by rotation of said plurality of members, and a relatively rigid biasing element operatively connected to the shiftable element associated with each one of said rods and being operatively connected to other one of said connecting rods and the member associated therewith in response to the shiftable movement of the shiftable element on the first named of said rods, in such manner that the shiftable elements on each one of said rods rotates the other one of said connecting rods in response to the movement of the shiftable elements to thereby control the speed of rotation of said main shaft.

10. The apparatus of claim 9 further characterized in that the other one of said connecting rods comprises a second of said connecting rods and the shiftable element associated therewith is next adjacent to a first of said connecting rods and the shiftable element associated therewith.

11. The apparatus of claim 9 further characterized in that said apparatus comprises four quadrilaterally located members and four quadrilaterally associated connecting rods associated therewith for operative connection to said main shaft, and four shiftable elements, each one of which is associated with an individual one of said connecting rods, and each one of said connecting rods being operatively connected to a shiftable element on a next adjacent connecting rod.

12. The apparatus of claim 9 further characterized in that a biasing rod connects an adapter on a first of said connecting rods which is rotatable therewith to the shiftable element associated with a second of said rods.

13. The apparatus of claim 9 further characterized in that said shiftable elements are biased in a first direction on associated connecting rods by centrifugal force, and spring means biases said shiftable elements in a second direction on the associated connecting rods.

14. An apparatus for controlling energization of an electrically operable device in response to a speed of rotation of a shaft member operating said device; said apparatus comprising a disc operatively associated with said shaft member and being rotatable therewith, a weighted shiftable member hingedly mounted on said disc and being biased in a first direction from a rest position to a contact position by centrifugal force, a first switch means also operatively associated with said disc and being operatively connected to said electrically operable device, said first switch means being located to be contacted by said shiftable member when in the contact position to actuate said first switch means, a support rod on said disc, a weight slidably shiftable on said rod in a first direction from a rest position to a contact position by centrifugal force, a second switch means located to be contacted by said weight when in the contact position to actuate said second switch means, said second switch means being operatively connected to said first switch means and said electrically operable device so that said electrically operable device can be energized when said first and second switch means have been actuated.

15. The apparatus of claim 14 further characterized in that said weighted shiftable member is biased in a second direction by a spring means associated therewith.

16. The apparatus of claim 14 further characterized in that said first and second switch means are electrically connected in parallel with respect to said electrically operable device.

17. A prime mover dynamo plant comprising a rotatable main shaft to provide a source of power, a plurality of rotatable driven shaft members operatively connected to said main shaft to drive said main shaft and which driven shaft members are rotatable in response to an external force, a plurality of externally powered drive members, each one of said externally powered drive members being respectively associated with and operatively connected to each one of said plurality of driven shaft members to drive said main shaft, a shiftable element operatively mounted on and being slidable on each of said driven shaft members and being biased in a first direction in response to centrifugal force created by rotation of said plurality of externally powered drive members, and a relatively rigid biasing element operatively connected to the shiftable element associated with each one of said driven shaft members and being operatively connected to a next adjacent of said driven shaft members to rotate the next adjacent of said driven shaft members and the drive member associated therewith in response to the shiftable movement of the shiftable element on the first named driven shaft member to thereby control the maximum speed of rotation of said rotatable main shaft in such manner that the shiftable elements on each one of said driven shaft members rotates the next adjacent one of said driven shaft members in response to the movement of shiftable elements to control the speed of rotation of said rotatable main shaft, each of said driven shaft members being rotatable about its longitudinal axis independent of the shiftable element mounted on and slidable therealong.

18. The dynamo plant of claim 17 further characterized in that said dynamo plant comprises four quadrilaterally located driven shaft members and four quadrilaterally associated drive members associated therewith for operative connection to associated driven shaft members, and four shiftable elements, each one of which is associated with an individual one of said driven shaft members and each one of said driven shaft members being operatively connected to a shiftable element on a next adjacent driven shaft member by an associated biasing element.

19. The dynamo plant of claim 17 further characterized in that said shiftable elements are biased in a first direction on associated driven shaft members by centrifugal force, and spring means biases said shiftable elements in a second direction on the associated driven shaft members.

20. A wind driven electric energy generating apparatus comprising:
a. support means,
b. a main shaft carried by said support means,
c. a plurality of vane shafts angularly located with respect to said main shaft,
d. means operatively connecting said vane shafts to said main shaft so that said main shaft rotates with rotation of said vane shafts,
e. a plurality of vanes secured to and extending outwardly from respective ones of said vane shafts to cause rotation of said main shaft when the vanes are driven by a wind,
f. electric energy generating means operatively connected to said main shaft and being operable thereby to generate electric energy pursuant to rotation of said shaft, said electric energy generating means comprising a field winding and a flux operable shaft cooperating therewith,
g. first speed control means operatively mechanically associated with said vane shafts and coupling each of said vane shafts to one another to prevent rotation of said vanes and said vane shafts and main shaft beyond a maximum threshold velocity of rotation, and
h. second speed control means operatively associated with said main shaft and having a rotatable member operatively rotatable thereby, said second speed control means operatively connected to said field winding of said electric energy generating means to prevent energy generation of said field winding and thereby prevent operation of said generating means if said main shaft and said vanes do not meet a minimum threshold velocity of rotation,
i. said first speed control means comprising:
1. a shiftable element operatively mounted on and being slidable on each of said vane shafts and being biased in a first direction in response to centrifugal force created by rotation of said plurality of vanes,
2. a relatively rigid biasing element operatively connected to the shiftable element associated with each one of said vane shafts and being operatively connected to another one of said vane shafts to rotate the other one of said vane shafts and vane associated therewith in response to the shiftable movement of the shiftable element on the first named of said vane shafts, in such manner that the shiftable elements on each of said vane shafts rotates the next adjacent one of said vane shafts in response to the movement of the slidable element to thereby control the speed of rotation of said main shaft.

21. The wind driven electric energy generating apparatus of claim 20 further characterized in that said electric energy generating means comprises a plurality of electric energy generating devices, each of which are operatively connected to said second speed control means, and auxiliary shaft means operatively connecting the flux operable shafts of said devices to said main shaft.

22. The wind driven electric energy generating apparatus of claim 20 further characterized in that gear operated means operatively connects said main shaft to said energy generating means, and that said gear operated means comprises a first gear operatively mounted on said main shaft, an auxiliary shaft means operating said electric energy generating means, a second gear operatively mounted on said auxiliary shaft means, connecting drive means interconnecting said first gear and second gear, means providing a lubricating fluid bath located to receive said first gear in such manner that said first gear and connecting drive means temporarily picks up and disperses the lubricating fluid to said second gear.

23. A wind driven electric energy generating apparatus comprising:
a. support means,
b. a main shaft carried by said support means,
c. a plurality of vane shafts angularly located with respect to said main shaft, d. means operatively connecting said vane shafts to said main shaft so that said main shaft rotates with rotation of said vane shafts,
e. a plurality of vanes secured to and extending outwardly from respective ones of said vane shafts to cause rotation of said main shaft when the vanes are driven by a wind,
f. electric energy generating means operatively connected to said main shaft and being operable thereby to generate electric energy pursuant to rotation of said shaft, said electric energy generating means comprising a field winding and a flux operable shaft cooperating therewith,
g. first speed control means operatively mechanically associated with said vane shafts and coupling each of said vane shafts to one another to prevent rotation of said vanes and said vane shafts and main shaft beyond a maximum threshold velocity of rotation, and
h. second speed control means operatively associatd with said main shaft and having a rotatable member operatively rotatable thereby, said second speed control means operatively connected to said field winding of said electric energy generating means to prevent energy generation of said field winding and thereby prevent operation of said generating means if said main shaft and said vanes do not meet a minimum threshold velocity of rotation,
i. said second speed control means comprising:
  1. a disc operatively associated with said main shaft and being rotatable therewith,
  2. a weighted shiftable member hingedly mounted on said disc and being biased in a first direction from a rest position to a contact position by centrifugal force,
  3. a first switch means also operatively associated with said disc and being operatively connected to said electrically operable device, said first switch means being located to be contacted by said shiftable member when in the contact position to actuate said first switch means,
  4. a support rod on said disc,
  5. a weight slidably shiftable on said rod in a first direction from a rest position to a contact position by centrifugal force,
  6. a second switch means located to be contacted by said weight when in the contact position to actuate said second switch means, said second switch means being operatively connected to said first switch means and said electrically operable device so that said electrically operable device can be energized when said first and second switch means have been actuated.

24. A prime mover dynamo plant comprising a rotatable main shaft to provide a source of power, a plurality of rotatable drive shaft members operatively connected to said main shaft to drive said main shaft and which driven shaft members are rotatable in response to an external force, a plurality of externally powered drive members, each one of said externally powered drive members being respectively associated with and operatively connected to each one of said plurality of driven shaft members to drive said main shaft, a shiftable element operatively mounted on and being slidable on each of said driven shaft members and being biased in a first direction in response to centrifugal force created by rotation of said plurality of externally powered drive members, a relatively rigid biasing element operatively connected to the shiftable element associated with each one of said driven shaft members and being operatively connected to a next adjacent of said driven shaft members to rotate the next adjacent of said driven shaft members and the drive member associated therewith in response to the shiftable movement of the shiftable element on the first named driven shaft member to thereby control the maximum speed of rotation of said rotatable main shaft in such manner that the shiftable elements on each one of said driven shaft members rotate the next adjacent one of said driven shaft members in response to the movement of shiftable elements to control the speed of rotation of said rotatable main shaft, each of said driven shaft members being rotatable about its longitudinal axis independent of the shiftable element mounted on and slidable therealong, an electrically operable device energizably controlled in response to a speed of rotation of said main shaft, a disc operatively associated with said main shaft and being rotatable therewith, a weighted shiftable member hingedly mounted on said disc and being biased in a first direction from a rest position to a contact position by centrifugal force, a first switch means also operatively associated with said disc and being operatively connected to said electrically operable device, said first switch means being located to be contacted by said shiftable member when in the contact position to actuate said first switch means, a support rod on said disc, a weight slidably shiftable on said rod in a first direction from a rest position to a contact position by centrifugal force, a second switch means located to be contacted by said weight when in the contact position to actuate said second switch means, said second switch means being operatively connected to said first switch means and said electrically operable device so that said electrically operable device can be energized when said first and second switch means have been actuated.

* * * * *